3,519,451
METHOD FOR PRODUCING A HYDROLYZED CASEIN DERIVATIVE LOW IN CALCIUM

Samuel Loshaek, Stamford, Conn., and Harold K. Salzberg, Bainbridge, N.Y., assignors to Borden, Inc., New York, N.Y., a corporation of New Jersey
No Drawing. Original application Nov. 27, 1963, Ser. No. 326,378, now Patent No. 3,421,918, dated Jan. 14, 1969. Divided and this application Aug. 6, 1968, Ser. No. 765,728
Int. Cl. C08h 7/00
U.S. Cl. 106—138    6 Claims

ABSTRACT OF THE DISCLOSURE

Casein is dissolved in an aqueous alkali at pH above about 11.5 together with about 4–10 parts by weight per 100 parts casein of a calcium ion suppressant selected from the group consisting of sodium oxalate, sodium fluoride, and sodium citrate. This solution is then heated with stirring to a temperature above 160° F. for a time between about 10–90 minutes at a pH above about 11.5. This reaction mixture is then filtered to remove the insoluble calcium salts leaving a hydrolyzed casein derivative having less than 0.2% calcium and capable of forming sprayable, clear, amber solutions in ethanol.

---

This invention relates to a process and composition for treating hair. The invention is particularly useful in providing a spray-on composition for setting of ladies' hair or wigs and will be illustrated by description in connection with such use.

This is a division of application Ser. No. 326,378, filed Nov. 27, 1963 now Pat. No. 3,421,918.

Various materials of resinous or polymeric type are in use for this purpose. A common material is a solution of shellac, referred to in the spraying hair trade as "lacquer." It is widely used in spite of the objections to it such as the undesirability of inhaling the spray, brittleness of the dried film, and difficult washability when it is attempted to remove an old application from the hair. Other resinous materials that have been proposed include polyacrylate, polyvinylpyrrolidone, and copolymers of the latter with vinyl acetate, as in Pat. 3,068,151 to Haefele.

Casein would seem to be a logical material for use in spraying hair because of similarity of chemical compositions to the keratin of hair and the expected good adhesion of protein to protein, relatively low cost, and metabolizable nature and nontoxic properties. In spite of such obvious advantages, however, casein, so far as known to us, has not been used to any substantial extent, if at all, as a hair spray prior to our study of the problems to be solved in the use and discovery of means for solving them.

The invention provides a casein composition that does not close the orifice through which the composition is sprayed on the hair, is substantially non-setting and non-precipitating on standing, drys clear in film form, is soluble in an alcohol water mixture of even high proportion of alcohol suitable for use on the hair, and is free in the film form from objectionable solvent power for the oils associated with human skin and hair.

Briefly stated, the invention comprises the herein described process of reacting a casein of limited calcium content with an alkanolamine and solution of the reaction product in a volatile solvent medium of alcohol and water. It comprises the process of setting or otherwise treating human hair or wigs by application of the solution thereto and then causing the volatile solvent medium to evaporate.

As to materials, the casein used is one which has been processed to reduce the total calcium content calculated as calcium oxide to a level below about 0.2% and suitably below 0.05% on the weight of the casein on the dry basis. This figure will be recognized as being very low when it is considered that commercial caseins will have ordinarily a calcium content, so calculated, within the approximate range 0.7–1.5%.

The amine which is reacted with the special casein is an alkanolmonoamine, i.e., contains the alkanol group or groups and only one amine group per molecule. The alkanol groups attached to the nitrogen atom of the amine have a minimum of two carbon atoms between the nitrogen and the hydroxyl of the alkanol group. Alkanolamines in which the hydroxyl is on the same carbon atom as the amine are known, but they behave as aldehydes or ketones and are unsuitable for our purpose.

The selected alkanolmonoamine should be freely soluble in water. It should be non-lipophylic, i.e., of little or no solubility in fats and oils including those of the skin and hair. Amines which are substantially soluble in oils have shown a high incidence of dermatitic action. To show such solubility properties, the amines used should contain 1–3 hydroxyl groups and 2–4 carbon atoms in each alkanol group, and have a molecular weight below 250, so as to restrict the proportion by weight of hydrocarbon (lipophylic) component to hydroxyl (hydrophylic) group. Examples of the alkanolamines that may be used with the casein and that illustrate the class are the following: Mono-, di-, or triethanolamine; N methyl diethanolamine; mono-, di-, or triisopropanelamine, and the corresponding n-propanolamines; 3 amino-1-propanol; 2-amino-2-methyl-1-propanol, 2-(hydroxyethylamine)-2-methylpropanol, 2-amino-2-methyl-1,3-propanediol and 2 - amino-1,4-butanediol.

The alcohol which is used in the alcohol-water solvent is any $C_{2-3}$ monohydric aliphatic alcohol, e.g., ethanol, isopropanol, or n-propanol, the ethanol being, for instance, the commercial industrial ethyl alcohols or any one of the denatured alcohol formulas which are permitted by law for use in hair spray preparations, i.e., any of those listed for this use in "Formulas for Denatured Alcohol," Part 212 Title 26CFR, IRS Publication No. 368. Representative formulas having current approval that we can use are: SDA LOA which consists of 100 gallons of ethyl alcohol denatured with 5 pounds of sucrose octaacetate and ⅛ gallon of tertiary butyl alcohol; SDA 23A which contains 10 gallons of acetone in each 100 gallons of ethyl alcohol; and SDA 23H having 8 gallons of acetone and 1½ gallons of methylisobutylketone in each 100 gallons of ethyl alcohol.

Methanol is unsuitable for use in any composition where toxicity is objectionable, as in a hair spray. Higher alcohols such as the butanols are unsuitable in any proportion that reduces the solvent power of the alcohol-water mixture for the alkanolamine-treated casein.

An important feature of the reaction products of the alkanolamines of the kind described with the special casein is their solubility or dispersibility in the alcohol and water medium over a wide range of proportions of alcohol to water, with practically no settling on standing. Thus we may use a medium with a water content as low as 5 parts per 100 parts of denatured alcohol, for rapid evaporation, or a medium containing as much as 100 parts of water per 100 parts of the alcohol for a moist spray that will prolong the period of keeping the hair soft. A low content of water in said medium tends to produce a colloidal cloudy dispersion of the alkanolamine-treated casein, but these cloudy dispersions are nevertheless stable on standing for several months. A higher content of water produces a clear, stable solution.

Any conventional and permissible known humectant and plasticizer for casein may be incorporated in usual proportions and for their customary effects. Examples are the liquid substantially nonvolatile polyols such as glycerine, sorbitol, polyethylene glycols of molecular weights between 300 and 2000, and urea, each introduced separately or in combination in the total amount of about 10–50 parts for 100 parts dry weight of the casein.

An excess of alkanolamine beyond that required to bring the casein into solution lowers the viscosity and, in the final film, shows humectant and plasticizer properties. Excess of the amine above the proportion stated gives additional plasticization and viscosity reduction of the film-forming components. A large excess of the amine above the ratio to casein stated may, however, produce stickiness of the film on the hair. In any case the alkanolamine represented in the dried film of its reaction product with the casein facilitates easy wash-away of an old application on the hair prior to respraying.

For the spraying of the alcohol-water dispersion of the reaction product of the amine and the casein, with the usual aersol type container and equipment, there may be used any propellant that is at this time accepted for spraying shellac or synthetic polymeric materials on hair, examples of such propellants being liquified lower hydrocarbons such as propane, n-butane and iso-butane and the low boiling chlorofluoro hydrocarbons identified broadly as Freons. For some applications it is advantageous to use propellants that have a low solubility for alcohol such as the hydrocarbons and those chlorofluoro hydrocarbons which do not have a hydrogen on the same carbon as a chlorine or fluorine, as, for example, Freon 142 which is $CH_3$—$CClF_2$, We use the selected alkanolamine in the amount of about 1 gram mole for 300–1000 grams of the special casein.

The use of the alkanolamine with the casein not only gives the desired dispersibility of the film-forming component in the alcohol and water medium, of wide permissible range of the two liquids, but also makes the amine and casein reaction product hydrophylic, so that it associates itself with the water of the medium. Since the water evaporates more slowly than the alcohol and a small but significant moisture content is normally a feature of hair exposed to humidity of the atmosphere, the effect of such association is film plasticization by water.

In addition to the materials stated, there may be incorporated in the hair spray composition other minor ingredients for their usual purposes and in usual amounts, these including wetting agents, defoamers, antibiotic agents, perfumes, coloring materials and like additives that are soluble in the alcohol-water medium.

As to conditions, we make the concentration of the amine-casein reaction product in the dispersion as sprayed about 2%–15% by weight, usually 3%–10%, and the pH approximately 6–9, the pH being established by control of the ratio of the alkanolamine used to the casein or by the addition of phosphoric, acetic or other acid or of sodium hydroxide or other alkali in amount as may be required to bring the final pH within the range stated. Neither added acid nor alkali is ordinarily necessary.

The special casein of low calcium content is prepared in any manner that will give the necessary low content of calcium without further denaturing the casin, i.e., without rendering the casein insoluble. In one process, we start with moist casein curd freshly precipitated by acid. The calcium content on the dry basis will vary from lot to lot, normally within the range about 0.7%–1.5%. The calcium is calculated as the oxide, although considered to occur largely as a loose complex with phosphate ions present as serine phosphate and polyphosphate attached to the casein molecules and also as adsorbed phospholipids. Dry casein may also contain calcium salts derived from hardness in the water used to wash the curd as well as calcium derived from dirt such as may be deposited during open air drying of the casein curd. To obtain a casein of low calcium content we carefully acidify milk or a solution of ordinary casein to the isoelectric point and wash the acid precipitated curd with hot water, as at a temperature within the range 140°–180° F. and at a pH near the isoelectric point so as to avoid solubilization of the casein, as, for instance, within the pH range 4.3 to 4.7. In a representative preparation, acid precipitated casein curd, prepared by mixing skimmed cow's milk with hydrochloric acid in amount to establish the pH at about 4.5, is washed repeatedly with hot water (140°–180° F.) until the analysis of the washed casein shows a content of calcium calculated as calcium oxide of less than 0.2%. Alternatively we may precipitate the casein with lactic acid produced by the fermentation of milk sugars by the milk souring bacteria of the genus Lactobacillus and then wash as described.

For application as an aerosol spray containing hydrocarbon propellants, it is desirable to reduce the calcium content of the casein to extremely low levels, e.g., below 0.5% as CaO. It is uneconomical to do this by washing the primary casein curd. To get the suitably low calcium content, we may redissolve the curd in an alkali and reprecipitate it useing an acid, such as hydrochloric or lactic, which forms freely soluble calcium salts. The secondary curd is then washed substantially free from calcium ions. It is possible to reduce the calcium content of casein, calculated as the oxide, from 2.5% down to less than 0.01% by a single recurding and washing operation.

In reacting the alkanolamine with the casein of low calcium content, we may mix the casein, either when wet and direct from the washing operation or in dry condition, with the selected alkanolamine. The reaction product that forms during the mixing is considered to be alkanolamine caseinate. The product is stored until it is to be made into the dispersion in the alcohol and water medium just before use, or it is incorporated at once into the medium.

The incorporation is suitably made by first mixing said reaction product with the water alone which is to appear in the medium or with water and a small part of the total alcohol to be used and then, when the swelling of the reaction product is effected, admixing the alcohol or the remainder of it.

With the special casein used, there is no substantial amount of material which separates from the finished dispersion. This is noted by absence of substantial settling of the dispersion on standing or tube centrifuging or absence of significant amounts of material retained on passage of the filterable dispersion through an ordinary laboratory filter paper.

The invention is further illustrated by description in connection with the following specific examples or the practice of it, proportions here and elsewhere herein being expressed as parts by weight except where specifically stated to the contrary and the viscosity and pH measurements being made at 25° C.

EXAMPLE 1

The hair spray was made of the following materials.

| Component: | Parts by wt. |
|---|---|
| Special casein (Ca content as CaO 0.1%) | 50 |
| Water | 150 |
| Glycerol (humectant) | 12 |
| 2-amino-2-methyl-1-propanol (AMP [1]) | 10 |
| Denatured alcohol (SDA–40A) | 360 |

[1] Abbreviation.

In making the above composition the casein, water, and all of the glycerol were mixed and allowed to stand for 30 minutes, to swell the reaction product. Then there were admixed the alkanolamine, AMP. The whole was next heated to 160° F. with agitation for about 10 minutes until the casein appeared to be fully dissolved. It was then cooled to 120° F. and the last and major portion of alcohol was introduced slowly with stirring. Perfume, if any, is stirred in at the end.

The preparation made from the special casein of the low calcium content appeared to be homogeneous. When sprayed from the usual aerosol container through a fine opening, it gave no plugging of the opening. It dried to a clear film that after drying was properly yieldable and effective as a setting agent on the hair and readily removable by washing with warm water.

EXAMPLE 2

The procedure of Example 1 was followed except that a portion of the alcohol, a tenth of the total to be used, was added to the soaking mixture of water and glycerol, that is, before heat was applied. The composition used was

| Component: | Parts by wt. |
|---|---|
| Recurded casein (Ca as CaO 0.01) | 50 |
| Water | 150 |
| Denatured alcohol (SDA–LOA), first addition | 40 |
| Glycerol | 12 |
| 2-amino-2-methyl-1-propanol (AMP) | 10 |
| Additional denatured alcohol (SDA–LOA) | 360 |

The resulting dispersion was a clear almost colorless solution which was stable in storage at normal room temperature, in both glass and lacquered tin plated steel containers, and deposited a clear film when sprayed and allowed to dry. It did not plug the nozzle during spraying.

After dilution with water, to equal parts by weight of water and alcohol, the solution was packaged in an aerosol can with a mixture of isobutane and chlorodifluoro methyl methane (Freon 142) as propellant, in the amount of about 40 parts of propellant for 60 parts of the diluted dispersion.

The dispersion was tested by several women according to usual technique for spraying on hair setting compositions. The results were favorable as to speed of drying, effectiveness of the set, and feel of the treated hair. Other tests showed easy removal of the dried film on washing with hot water.

EXAMPLE 3

The components, proportions and process of Example 2 were followed, except that a chemically equivalent amount of tri-isopropanolamine, that is 21 parts, were substituted for the 10 parts of AMP. The resultant solution had excellent clarity and deposited only a trace of precipitate even after long standing.

EXAMPLE 4

The components, procedure and composition of Example 1 were used except that the AMP was replaced by 7 parts of monoethanolamine.

EXAMPLE 5

The casein of low calcium content is first made as follows: A 10% solution of commercial casein in a mixture of 97 parts of water and 3 parts of ammonium hydroxide was passed through an ion exchange column holding granules of a cationic exchange resin (Duolite C–20 of which the active material is sulfonated polystyrene). The resin had been converted first from the sodium to the ammonium form by washing it successively with ammonium chloride solution and ammonium hydroxide until the elutriate was chlorine-free. The casein solution after passing through the column of resin was treated with hydrochloric acid to precipitate the casein, which was then dried.

The casein so processed was substituted in the amount of 50 parts for the casein in the composition and procedure of Example 2. A commercial grade of mixed isopropanolamines was used as the alkanolamine solvent in place of triisopropanolamine. The 25:75 aqueous alcohol solution could be diluted with an additional 360 parts of alcohol without causing precipitation, whereas the solution of the untreated casein tolerated only 280 parts of additional alcohol.

EXAMPLE 6

The proportions and procedure of Example 2 were followed using a series of caseins of varying ash content. The alcoholic solutions were centrifuged and the quantity of sediment corresponding to each casein was recorded. Caseins 1–5 of low calcium content in the first part of the table are acceptable for use in this invention as noted. Caseins with high calcium content were unacceptable for use in sprays, are outside the invention, and are here given for comparison only.

| Casein | Calcium as CaO, percent | Insoluble matter, ml. in 15 ml. solution | Comment |
|---|---|---|---|
| 1 | 0.01 | 0.025 | Acceptable. |
| 2 | 0.03 | .04 | Do. |
| 3 | 0.05 | .025 | Do. |
| 4 | 0.16 | .00 | Do. |
| 5 | 0.17 | .05 | Do. |
| 6 | 0.31 | 0.25 | Unacceptable. |
| 7 | 0.43 | 0.50 | Do. |
| 8 | 0.75 | 0.35 | Do. |
| 9 | 0.83 | 0.25 | Do. |
| 10 | 1.64 | 5.60 | Gels. |

EXAMPLE 7

The components, proportions and procedure of Example 1 are used exactly as there described, except that the glycerol is omitted. The resulting product is satisfactory as a hair spray only when pliability and absorptiveness for moisture from the atmosphere are not necessary in the dried film for the intended use.

EXAMPLE 8

We have found that hydrolysis of casein by heating it in alkaline solution reduces the viscosity of our alcoholic composition made from the casein-amine reacted product and gives a product of good solubility.

The components, proportions and procedure of Example 1 were used except that 10 parts of 26° Be. ammonium hydroxide were added to the composition before the heating to 160° F. there described, the addition providing a more alkaline environment. The mixture had a viscosity of 150,000 centipoises after 10 minutes heating. A part of the solution was then further heated at 160° F. for a total of 90 minutes, the viscosity then being 75,000 centipoises. When processed into solutions according to Example 1, the solution made from the material that had been heated for 90 minutes yielded only 0.025 ml. of sediment on centrifuging 15 ml. of the solution, in contrast to 0.05 ml. of sediment for the solution of material heated only 10 minutes.

EXAMPLE 9

Hydrolysis of casein at high pH to produce a product of viscosity below 50,000 centipoises as measured in Example 8, ordinarily results in the production of phosphoproteins or other products that are insoluble in alcohol water solutions of high concentration of alcohol. Such hydrolysis is useful, however, for making hair spray compositions containing approximately equal proportions of alcohol and water.

The hydrolysis can be effectively combined with decalcification as follows:

Commercial Casein (Ca as CaO 0.7%)—100 parts
Water—1000 parts
Sodium hydroxide in amount to make—pH 12
Sodium oxalate—4 parts The casein was soaked in water for 10 minutes, sodium hydroxide (about 8 parts) was then added until the pH reached 12. The mixture was then heated with stirring at 180° F. and held at this temperature for 1 hour during which time the pH dropped to 11.5 and the casein was partially hydrolyzed.

The solution was then cooled, the sodium oxalate added to precipitate the calcium and the solution filtered to remove dirt and precipitated calcium oxalate. The solution was then curded with hydrochloric acid added to lower the pH to 4.5, and the curd was washed and dried.

The resultant casein product was made up as a hair spray as follows:

| | Parts |
|---|---|
| Hydrolyzed and decalcified casein of this example | 5 |
| Water | 10 |
| Alcohol (SDA-40A) | 50 |
| AMP | 1 |

The solvent system, after correction for water in the alcohol and in the casein, contains about 85 parts of alcohol for 15 parts of water.

The solution was turbid and deposited 0.15 ml. of precipitate and was unsuitable for use as a hair spray. The solution was then diluted with water until the solvent contained only 50% alcohol. The resulting solution was clear, low in viscosity and useful as a hair spray.

In order to retain the desirable film-forming characteristics of casein it is necessary to terminate hydrolysis while the casein is still undenatured, i.e., still curdable by acid as at the isoelectric point in the pH range 4–5.

Other alkalies, e.g., potassium hydroxide, lithium hydroxide, or tetraethanolammonium hydroxide may be substituted for the sodium hydroxide in amount to establish the pH at about 11.5–12.5 and suitably at least 12. The temperature of heating is at least 160° F. and not above that which will produce boiling in the equipment used. The time of heating is that which will produce a substantial reduction in the viscosity of the solution of caseinamine product.

In order to retain the desirable film-forming characteristics of the casein it is necessary to terminate hydrolysis, that is to lower the temperature or the pH or both, while the casein is still curdable by acid, as at the isoelectric point in the pH range 4–5.

EXAMPLE 10

We have found that still further improvements can be made in the alkali hydrolyzate casein by heating at a high pH in the presence of a suppressant, i.e., precipitant or sequestrant, of calcium ions. The following "Preparations" A–D utilize representative decalcifying agents that reduce the calcium ion concentration below that which will precipitate as tricalcium phosphate.

| | Parts | | | |
|---|---|---|---|---|
| Preparation No. | A | B | C | D |
| Commercial casein (Ca as CaO 0.7%) | 100 | 100 | 100 | 100 |
| Water | 1,000 | 1,000 | 1,000 | 1,000 |
| Calcium ion suppressants: | | | | |
| Sodium oxalate | 4 | | | |
| Sodium fluoride | | 4 | | |
| Sodium citrate | | | 10 | |
| Tetrasodium ethylenediamine tetraacetate | | | | 10 |
| Sodium hydroxide, about | 8 | 8 | 8 | 8 |

In making the several preparations, the casein was soaked in the water for 10 minutes before the agent to remove calcium ions was added. Sodium hydroxide was then introduced until the pH reached 12. The resulting mixture was heated with stirring to 180° F. and held at this temperature for one hour to partially hydrolyze the casein. At the end of this time, the pH had dropped to 11.5–11.7 and the solutions had become unexpectedly a clear amber, instead of the usual translucent khaki of the solutions of Example 9. The solutions were filtered to remove dirt and any precipitated calcium salts, then curded with hydrochloric acid added to pH 4.5, and the curd washed and dried. About 85–90 parts of curded casein product were obtained in each case.

A hair spray base was then made up using in turn each of the 4 casein products obtained above as follows:

| | Parts | | | |
|---|---|---|---|---|
| Casein from preparation | A | B | C | D |
| Amount of the casein | 5 | 5 | 5 | 5 |
| Water | 10 | 10 | 10 | 10 |
| Alcohol (SDA-40A) | 50 | 50 | 50 | 50 |
| AMP | 1 | 1 | 1 | 1 |
| Precipitate (formed and filtered off) | .05 | .05 | .05 | .08 |

In each case the result was a clear amber solution that made an excellent hair spray, even in solutions of the high alcohol to water content shown.

EXAMPLE 11

The advantages of alkaline hydrolysis in the presence of a calcium ion suppressant are obtained to a substantial degree with a minimal hydrolysis. Thus the procedure of Example 10C, that used sodium citrate and an hour's heating at 180° F., was repeated except that the heating was shortened to only 10 minutes. The casein product was similar to that obtained in Example 10C.

Five parts of this product of 10 minutes' heating were mixed with one part of AMP and the whole then dissolved in 10 parts of water and 50 parts of alcohol. The solution was clear and of amber color. The viscosity of this solution was substantially greater than the viscosity of the corresponding alcoholic solution of 10C that had been hydrolyzed at 180° F. for one hour. It contained a higher though still allowable quantity of insoluble material. On centrifugation only 0.08 ml. of precipitate was produced in 15 ml. of solution.

It will be understood that it is intended to cover all changes and modifications of the examples of the invention herein chosen for the purpose of illustration which do not constitute departures from the spirit and scope of the invention.

We claim:

1. A process of producing a hydrolyzed casein derivative containing less than about 0.2% calcium calculated as CaO by weight of said casein and capable of forming sprayable, clear, amber solutions in ethanol, which process comprises dissolving the casein in an aqueous alkali at pH above about 11.5 together with between about 4 and about 10 parts by weight per 100 parts of said casein of a calcium ion suppressant selected from the group consisting of sodium oxalate, sodium fluoride, sodium citrate and tetrasodium ethylene diamene tetraacetate, heating with agitation to a temperature between about 160° F. and not above that which will produce boiling for a time between about 10 and about 90 minutes at pH above about 11.5, filtering, acidifying to pH 4–5, washing the resultant curd and drying.

2. The process of claim 1 wherein the alkali is selected from the group consisting of sodium hydroxide, lithium hydroxide, potassium hydroxide and tetraethanol ammonium hydroxide.

3. The process of claim 2 wherein the alkali is sodium hydroxide and the calcium ion suppressant is sodium citrate.

4. A process of producing a clear aqueous solution of casein hydrolyzate containing less than about 0.2% calcium calculated as CaO by weight of said casein which comprises dissolving the casein in an aqueous alkali at pH above about 11.5 together with between about 4 and about 10 parts by weight per 100 parts of said casein of a calcium ion suppressant selected from the group consisting of sodium oxalate, sodium fluoride and sodium citrate, heating with stirring to a temperature between about 160° F. and not above that which will produce boiling for a time between about 10 and about 90 minutes at pH above about 11.5 and filtering.

5. The process of claim 4 wherein the alkali is sodium hydroxide and the calcium ion suppressant is sodium citrate.

6. The process of claim 4 which includes admixing an alkanol monoamine having 2–4 carbon atoms to each alkanol group into the solution, the proportion of the amine used being at least about 1 gram mole for 300 to 1000 grams of casein.

References Cited

UNITED STATES PATENTS 3,421,918  1/1969  Loshaek et al. _____ 106—147

JULIUS FROME, Primary Examiner

J. H. MILLER, Assistant Examiner

U.S. Cl. X.R.

260—119, 120